US012251348B2

(12) United States Patent
Rodriguez

(10) Patent No.: US 12,251,348 B2
(45) Date of Patent: Mar. 18, 2025

(54) READY LIFT SYSTEM AND METHOD FOR POSITIONING PATIENTS

(71) Applicant: ProTonics, LLC, Jackson, WY (US)

(72) Inventor: Luis Rodriguez, Vero Beach, FL (US)

(73) Assignee: ProTonics, LLC, Jackson, WY (US)

( * ) Notice: Subject to any disclaimer, the term of this patent is extended or adjusted under 35 U.S.C. 154(b) by 277 days.

(21) Appl. No.: 17/699,501

(22) Filed: Mar. 21, 2022

(65) Prior Publication Data

US 2023/0293370 A1 Sep. 21, 2023

(51) Int. Cl.
*A61G 7/10* (2006.01)

(52) U.S. Cl.
CPC ......... *A61G 7/1013* (2013.01); *A61G 7/1026* (2013.01); *A61G 7/1034* (2013.01)

(58) Field of Classification Search
None
See application file for complete search history.

(56) References Cited

U.S. PATENT DOCUMENTS

2012/0144581 A1* 6/2012 Roberg ................ A61G 7/1026 5/81.1 C
2016/0089291 A1* 3/2016 Tilk ..................... A61G 7/1046 5/81.1 HS
2016/0256341 A1* 9/2016 Counts ................. A61G 7/1034
2017/0159289 A1* 6/2017 Strong .................. E04B 2/7437
2019/0021510 A1* 1/2019 Gao ........................ A47C 20/08
2019/0240095 A1* 8/2019 Yilmaz ................ A61G 7/1026
2021/0052197 A1* 2/2021 Sukumaran .......... A61B 5/6892

FOREIGN PATENT DOCUMENTS

CN 108578127 A * 9/2018

* cited by examiner

*Primary Examiner* — Adam C Ortiz
(74) *Attorney, Agent, or Firm* — Goodman Law Center

(57) ABSTRACT

A system and method of lifting and positioning patients uses a patient's center of gravity for leverage to enable a caregiver to readily move a patient with less effort. The system includes a device with a tension sheet and tension rollers located at opposite ends of the device. The tension rollers are configured to increase tension in the tension sheet, which creates leverage to assist positioning of the patient. The patient lifting and positioning system aims to reduce injury risk for both the caregiver and any patient being assisted to lay down and sit up. Further, the system and method uses leverage to assist a patient lay flat on an exam table or bed from the sitting position to the laying position, and back to the sitting position with less effort.

2 Claims, 9 Drawing Sheets

FIG. 4A
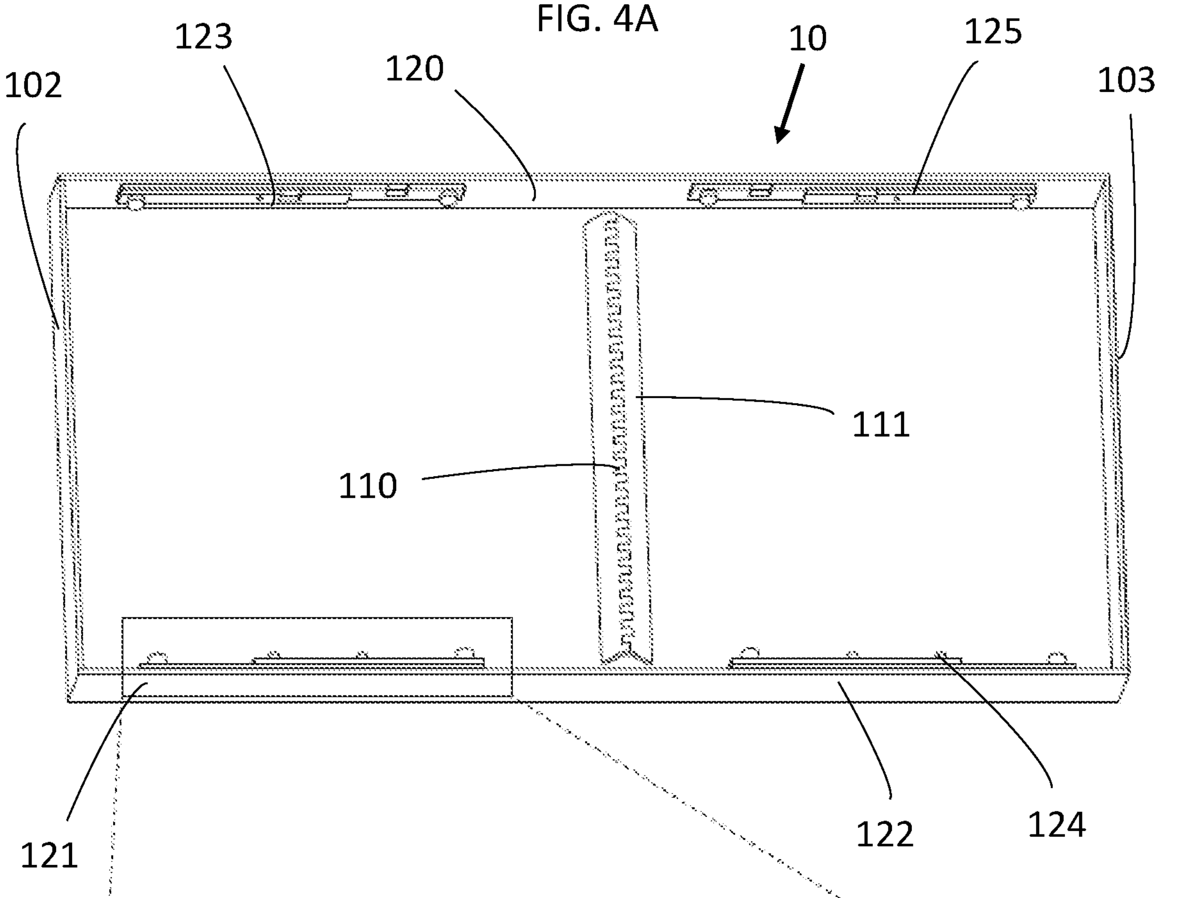
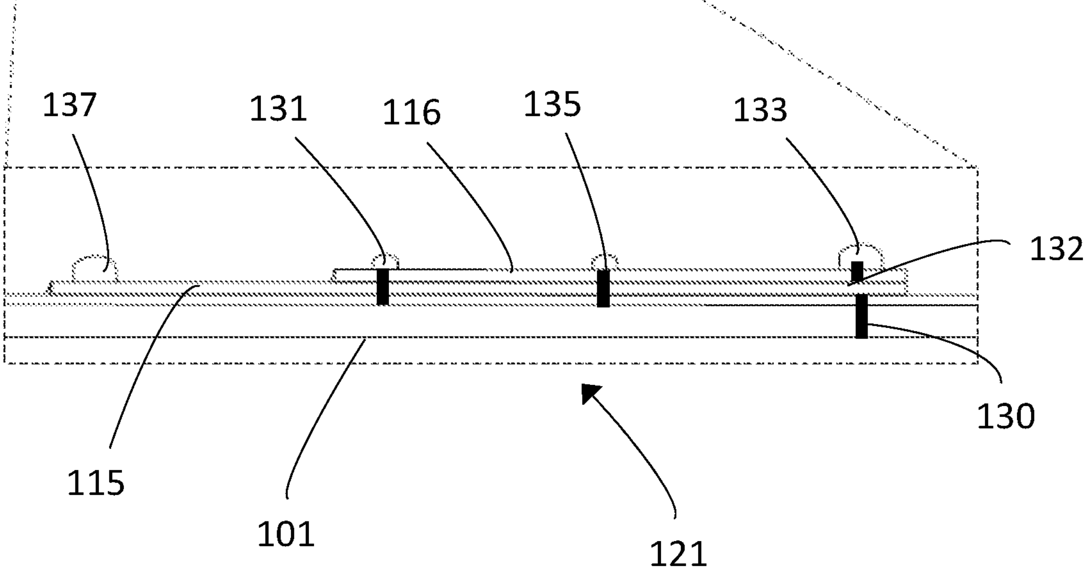
FIG. 4B

READY LIFT SYSTEM AND METHOD FOR POSITIONING PATIENTS

CROSS-REFERENCE TO RELATED APPLICATIONS

This is a Nonprovisional Utility U.S. Patent Application under 37 CFR 1.53(b).

BACKGROUND OF THE INVENTION

1. Field of the Invention

The present invention relates generally to positioning aids and systems for lifting patients. More particularly, the present invention relates to lifting systems that improve leverage to reduce effort in lifting and minimize risk of injury for patients and care providers.

2. Description of Related Art

There is a need in the field of patient positioning for a system that improves leverage, thereby reducing the required effort and minimizing the injury risk for patients and care providers.

SUMMARY OF THE INVENTION

A system of lifting and positioning patients uses a patient's center of gravity for leverage to enable a caregiver to readily move a patient with less effort. The system includes a device with a tension sheet and tension rollers located at opposite ends of the device. The tension rollers are configured to increase tension in the tension sheet, which creates leverage to assist positioning of the patient.

A method of positioning patients includes a tension sheet and tension rollers located at opposite ends of the device. Each roller can be rotated to increase or decrease tension. When a first roller is rotated in a direction away from the second roller, tension is increased in the tension sheet. The increase in tension creates leverage in the device, enabling a caregiver to readily move a patient with less effort.

The patient lifting and positioning system aims to reduce injury risk for both the caregiver and any person being assisted to lay down and sit up. Further, the system and method uses leverage to assist a patient lay flat on an exam table or bed from the sitting position to the laying position, and back to the sitting position with less effort. Expending less effort to position a patient minimizes the probability of further injury to the patient and care provider. The system can assist in lifting a patient's legs to accommodate any support pillows or medical/diagnostic tools. The system can be implemented on radiologic exam tables, physical therapy tables, MRI/CT scan tables, or any laying surface. An MRI conditional device can also be implemented. For example, an MRI conditional device can be made of MRI "safe" materials, enabling the system to be used around high magnetic fields.

These and other features and advantages will be apparent from reading of the following detailed description and review of the associated drawings. It is to be understood that both the forgoing general description and the following detailed description are explanatory and do not restrict aspects as claimed.

BRIEF DESCRIPTION OF THE DRAWINGS

FIG. 4A illustrates a top view of an embodiment of the ready lift patient positioning system without a tension sheet.

FIG. 4B illustrates an enhanced view of the first lift mechanism on the first side of the ready lift patient positioning system.

DETAILED DESCRIPTION OF EMBODIMENTS

The following descriptions relate principally to preferred embodiments while a few alternative embodiments may also be referenced on occasion, although it should be understood that many other alternative embodiments would also fall within the scope of the invention. The embodiments disclosed are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art, and they generally should not be restricted to formal or ideal definitions, conceptually encompassing equivalents, unless and only to the extent that a particular context clearly requires otherwise.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. Furthermore, unless explicitly dictated by the language, the term "and" may be interpreted as "or" in some instances. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more. Thus, in the context of this specification, the term "comprising" is used in an inclusive sense and thus should be understood as meaning "including, but not limited to." As used herein, the use of "may" or "may be" indicates that a modified term is appropriate, capable, or suitable for an indicated capacity, function, or usage, while considering that in some circumstances the modified term may sometimes not be appropriate, capable, or suitable. "Plurality" is defined as more than one (two or more) when used to describe a quantity in the description and claims.

Figure 1:
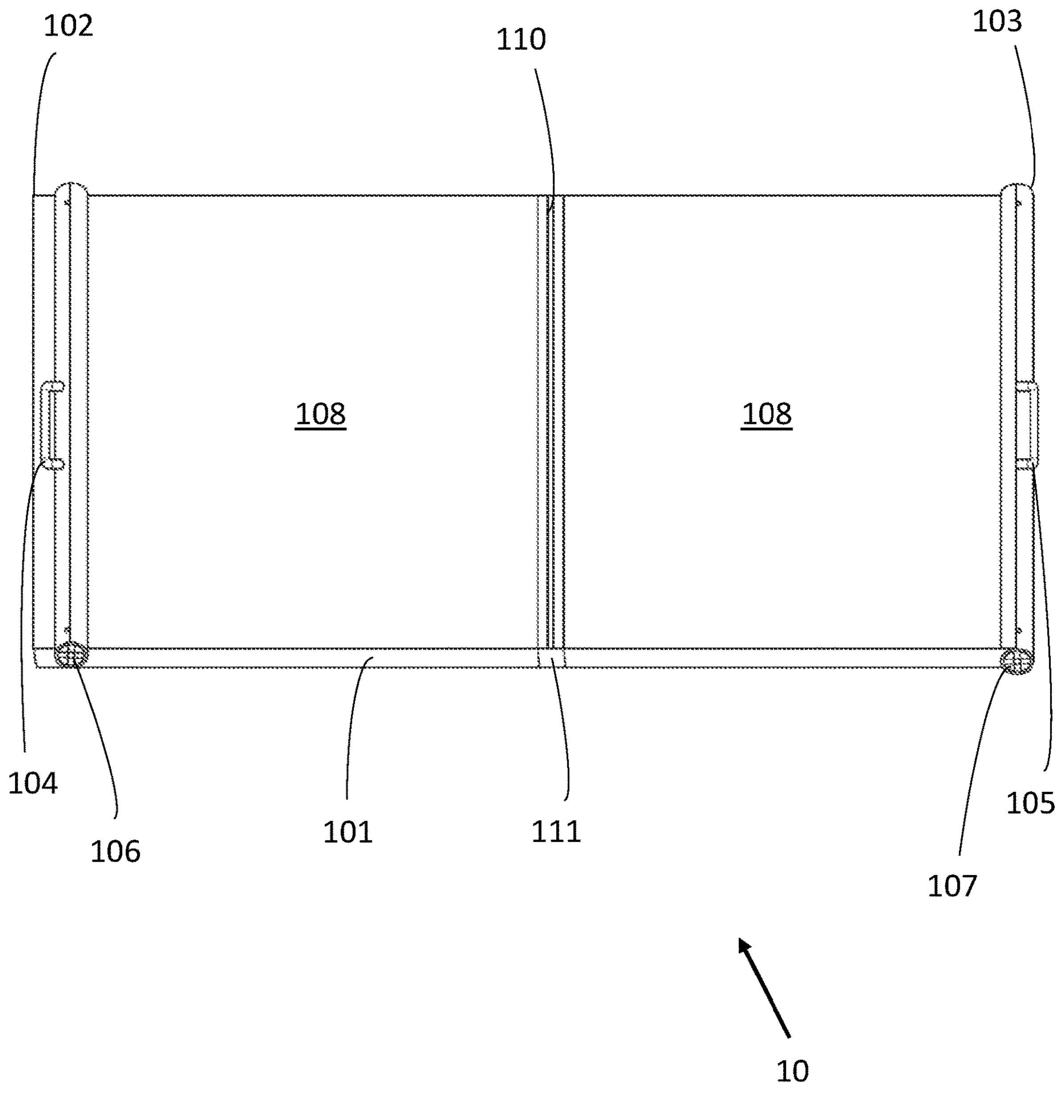
FIG. 1 illustrates a top view of an embodiment of the ready lift patient positioning system.

FIG. 1 illustrates a top view of an embodiment of the ready lift patient positioning system 10. The system 10 includes a frame 101 that is configured to secure the device to a surface being used (e.g. an exam table). In this embodiment 10, the frame 101 is L-shaped with an adjustable width and length. The system 10 includes a first end 102 and a second end 103. The system 10 is preferably symmetrical, enabling a patient's head or feet to rest on either the first end 102 or the second end 103. The first end 102 includes a first handle 104 enabling an operator (e.g. caregiver) to lift the first end 102 of the device. Similarly, the second end 103 includes a second handle 105 enabling an operator (e.g. caregiver) to lift the second end 103. The first end 102 further includes a first tension roller 106 that is affixed (attached) to the first end 102. The second end 103 further includes a second tension roller 107 that is affixed (attached) to the second end 103.

The system 10 further includes a tension sheet 108 constructed of materials with enough strength to maintain proper tension and support a patient's weight. The tension sheet 108 is preferably made of waterproof material(s) to protect against damage from fluids (e.g. water, bodily fluids) . The system 10 also includes a center guide 110 that is located approximately in the middle of the device between the first end 102 and second end 103. The center guide 110 can function as a flexible elastic band that "guides" an exam sheet over the tension sheet 108 to keep the exam sheet in position throughout use. Further, the center guide 110 includes a base 111 configured to function as a hinge that provides central support to the tension sheet 108. The base 111 can be constructed of plastic or other suitable materials. The center guide 110 can be affixed to the tension sheet 108 using fasteners such as hook-and-loop fasteners, buttons, straps, etc. Further, it is desirable to position a patient's body so that the patient's center of gravity is approximately located above the center guide 110.

Figure 2:
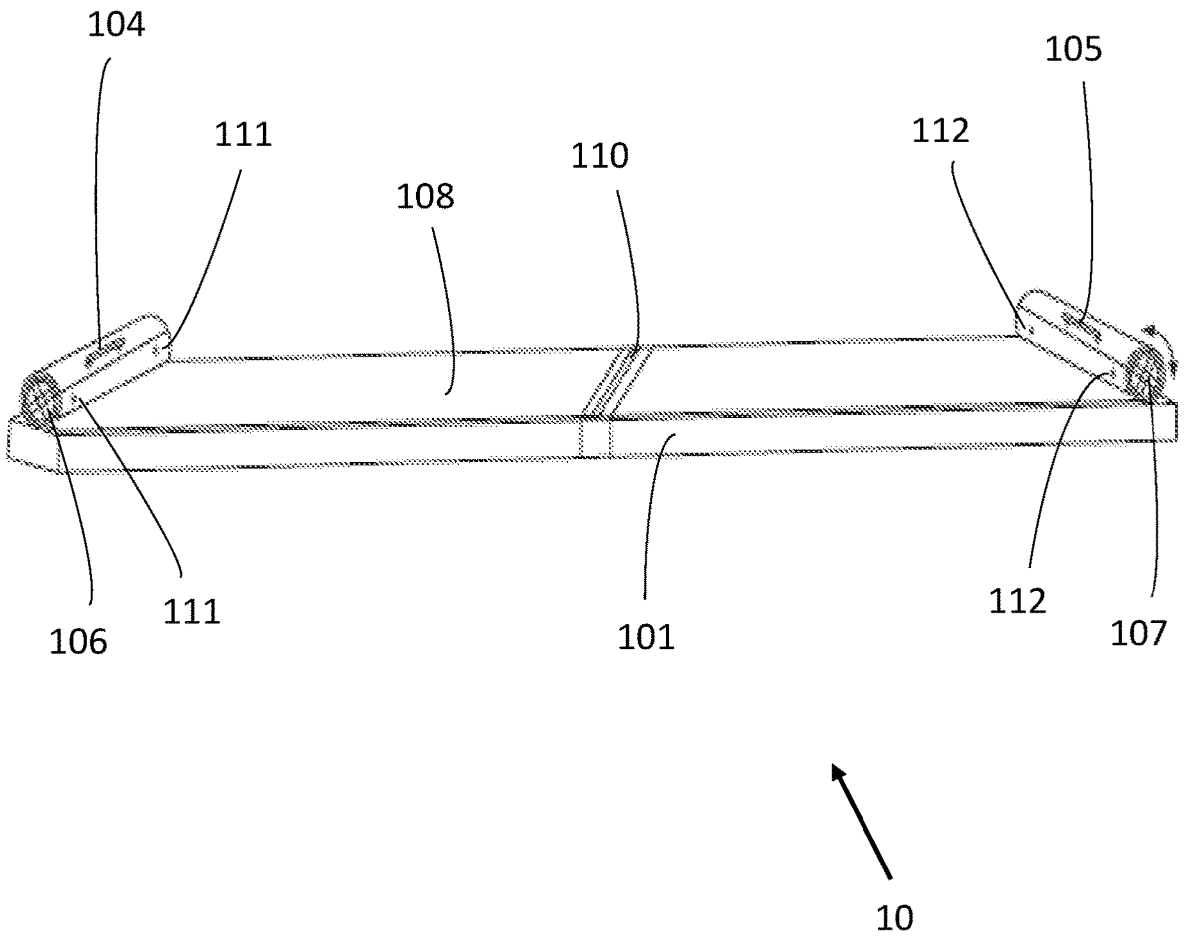
FIG. 2 illustrates a side view of an embodiment of the ready lift patient positioning system.

FIG. 2 illustrates a side view of an embodiment of the ready lift patient positioning system 10. The system 10 is shown in the "rest" position with the tension sheet 108 flat without any bends. The first tension roller 106 includes a plurality of fasteners (e.g. snap buttons) 111. The second tension roller 107 also includes a plurality of fasteners 112. In this example, snap buttons 111 are used to secure (attach) the tension sheet 108 to the first tension roller 106. Alternatively, hook and loop fasteners or other fasteners can be utilized for attaching the tension sheet 108 to the first tension roller 106. Similarly, the fasteners (e.g. snap buttons) 112 are used to secure (attach) the tension sheet 108 to the second tension roller 107. In this example embodiment 10, there are two fasteners 111 on the first tension roller 106 and two fasteners 112 on the second tension roller 107. Other quantities of fasteners 111, 112 can be implemented for attaching the tension sheet 108. The first handle 104 and second handle 105 enable an operator to readily assist a patient in laying down, sitting up, and adjusting the patient's legs.

Figure 3:
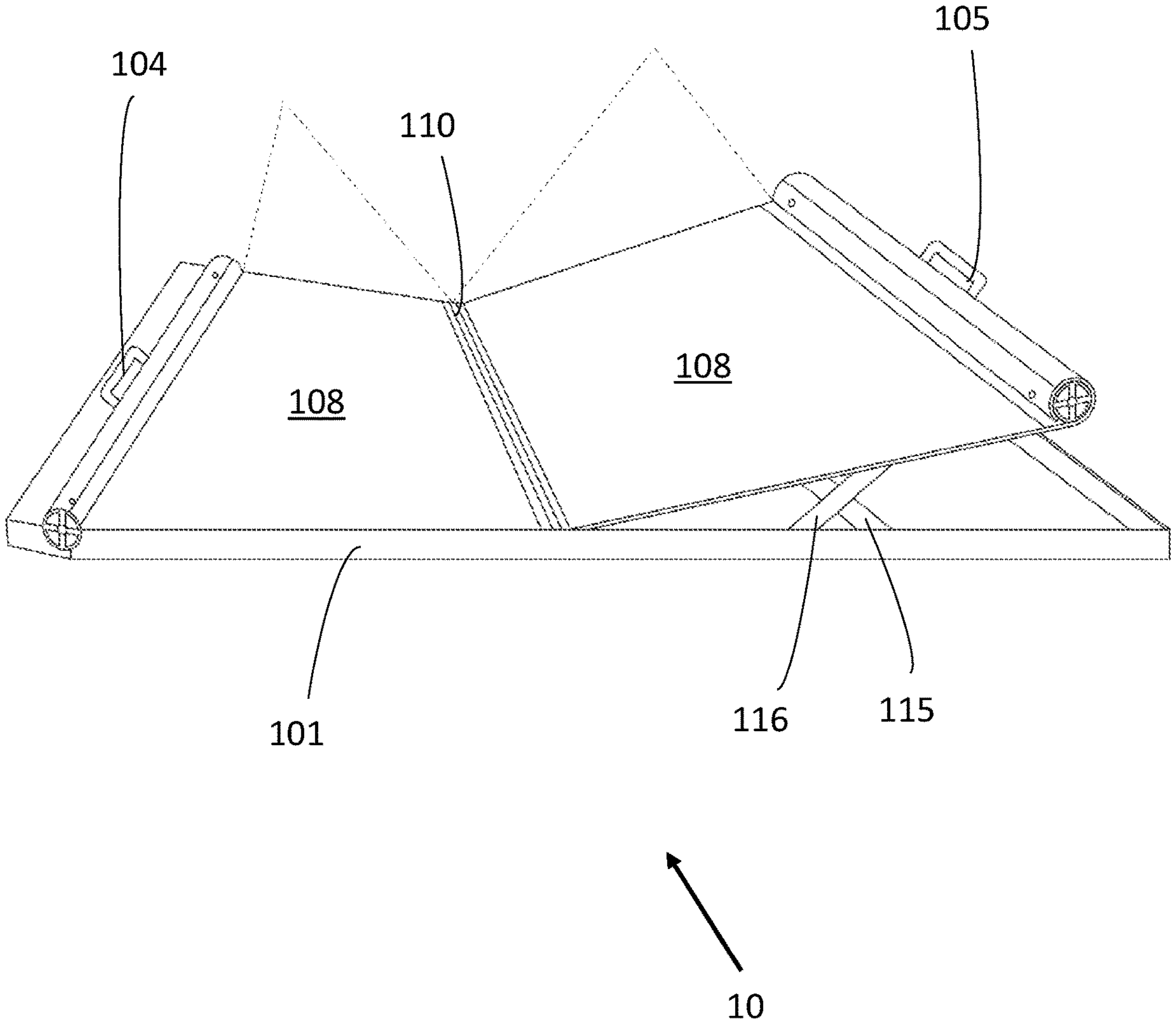
FIG. 3 illustrates a perspective view of an embodiment of the ready lift patient positioning system.

FIG. 3 illustrates a perspective view of an embodiment of the ready lift patient positioning system 10. The system 10 is shown in the "work" position with the tension sheet 108 bent in the middle along the center guide 110. A first bracket 115 and a second bracket 116 provide support to the tension sheet and function as a lifting mechanism. A more detailed description of how the brackets 115, 116 function as a lifting mechanism is given in reference to FIG. 4.

FIG. 4A illustrates a top view of an embodiment of the ready lift patient positioning system 10 without a tension sheet 108. The tension sheet 108 is removable and when removed, the lift and support mechanisms are visible. The first end 102 of the device includes a first lift mechanism 121 on a first side 120 and a second lift mechanism 123 on a second side 122 of the frame 101. The second end 103 of the device includes a third lift mechanism 124 on the first side 120 and a fourth lift mechanism 125 on the second side 122 of the frame 101. Further, there is shown the center guide 110 with the base 111 configured to function as a hinge.

FIG. 4B illustrates an enhanced view of the first lift mechanism 121 on the first side 120 of the ready lift patient positioning system 10. It should be understood that the first lift mechanism 121 is shown as an example and the other lift mechanisms 123, 124, 125 are structurally and functionally similar. A first bracket (long) 115 and a second bracket (short) 116 are attached to the frame 101. A first retainer pin 130 can be implemented to attach the first bracket (long) 115 to the frame 101. A first rotating pin 132 can be used to attach the second bracket (short) 116 to a first insert 133. The first insert 133 can be constructed of plastic or other suitable materials. The first insert 133 can be attached to the tension sheet 108 using a fastener such as a hook-and-loop fastener. Attaching the first insert 133 to the tension sheet 108 using a fastener enables the second bracket (short) 116 to operatively connect to the tension sheet 108.

Further, a center pin 135 can be implemented to connect the first bracket (long) 115 to the second bracket (short) 116. The center pin 135 enables the lift mechanism 121 to move from the rest to work position and the reverse. A second retainer pin 131 can be implemented to attach the second bracket (short) 116 to the frame 101. A second rotating pin 136 can be used to attach the first bracket (long) 115 to a second insert 137. The second insert 137 can be attached to the tension sheet 108 using a fastener such as a hook-and-loop fastener 138. Attaching the second insert 137 to the tension sheet 108 using a second fastener 138 enables the first bracket (long) 115 to operatively connect to the tension sheet 108.

Figure 5A:
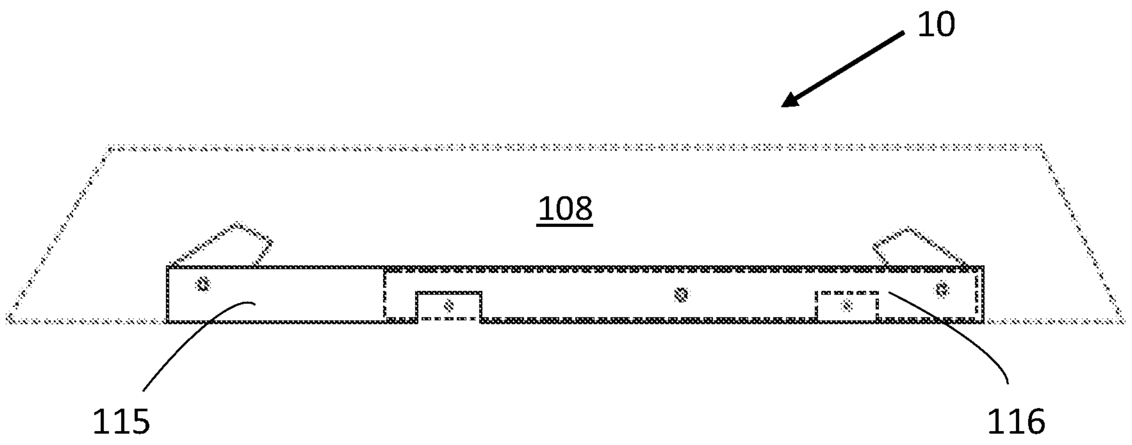
FIG. 5A illustrates the ready lift patient positioning system in a rest position and FIG. 5B illustrates the system in a work position.
Figure 5B:
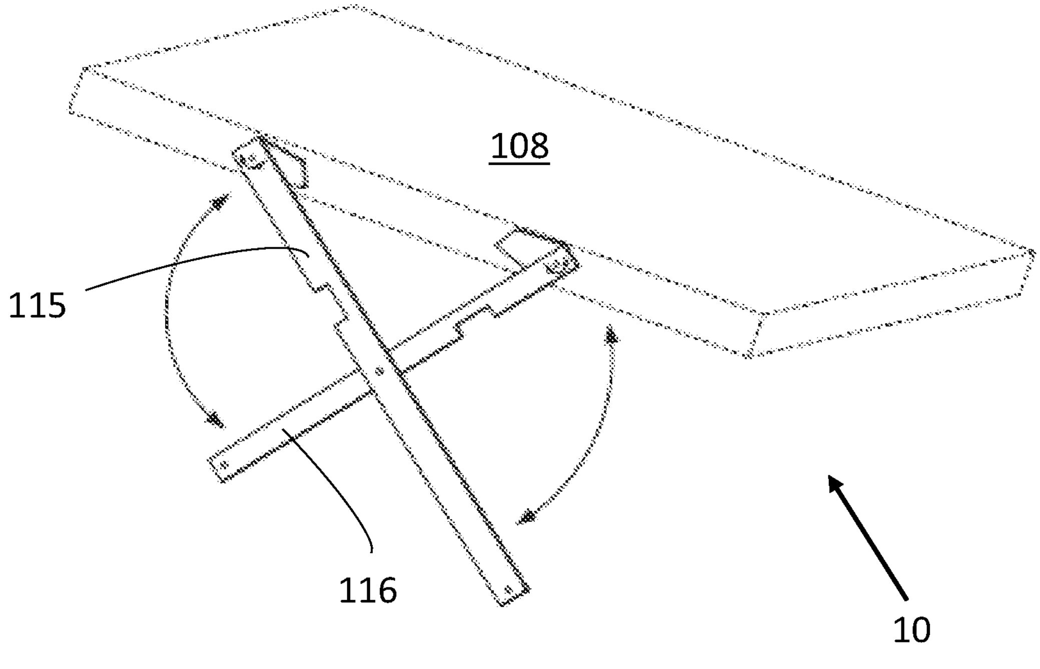

FIG. 5A illustrates the ready lift patient positioning system 10 in a rest position and FIG. 5B illustrates the system 10 in a work position. In the rest position shown in FIG. 5A, the brackets 115, 116 are folded inward and parallel. In the work position shown in FIG. 5B, the brackets 115, 116 are folded outward and crossing at an angle.

Figure 6:
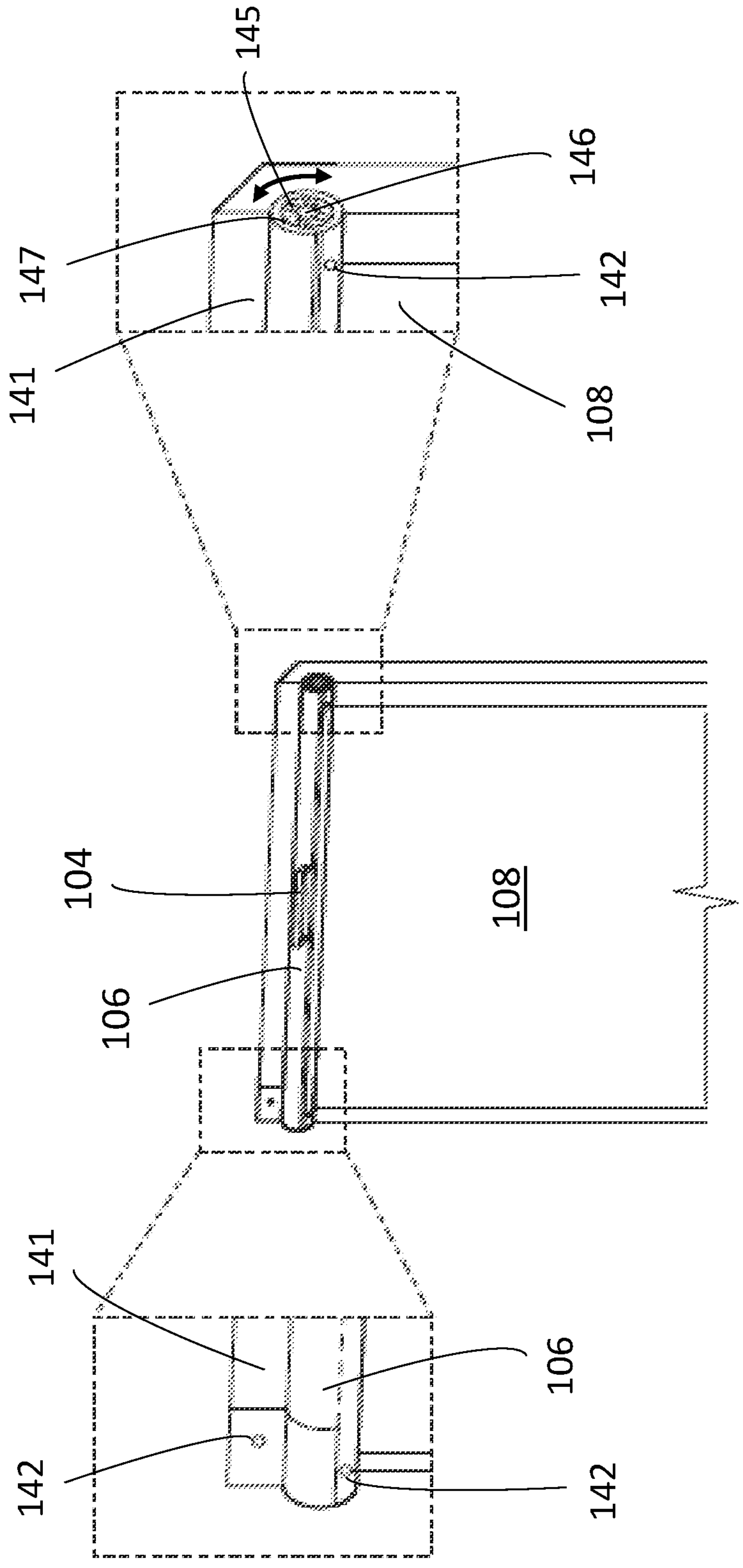
FIG. 6 illustrates enhanced detailed views of a tension roller for the ready lift patient positioning system.

FIG. 6 illustrates enhanced detailed views of a tension roller 106 for the ready lift patient positioning system 10. On the left side of FIG. 6, there is shown an enhanced detailed view of a tension roller 106. An exam sheet retainer 141 can be implemented at the first end 102 of the device, to hold an exam sheet to the first tension roller 106 during use. The exam sheet retainer 141 can include fasteners such as a plurality of snap buttons 142. The fasteners 142 enable the exam sheet retainer 141 to attach to the tension roller 106. A second exam sheet retainer can also be implemented at the second end 103 of the device, to hold an exam sheet to the second tension roller 107.

The right side of FIG. 6 illustrates an enhanced detailed view of the mechanisms of the tension roller 106 for the ready lift patient positioning system 10. The tension roller 106 can include an outer housing 144. A tension roller tensor 145 can hold and maintain tension during use. A manual tension adjuster (e.g. roller knob) 146 enables an operator/user to increase or decrease tension in the tension sheet 108. Further, a tension roller bearing 147 enables movement of the tension roller 108 up to 180 degrees. For example, a user can rotate the manual tension adjuster 146 in a direction (e.g. clockwise) away from the center guide 110 to increase tension in the tension sheet 108. The user can rotate the roller knob 146 in an opposite direction (e.g. counter-clockwise) toward the center guide 110 to decrease tension in the tension sheet 108. As the user rotates the roller knob 146, the tension roller bearing 147 rotates and the tension roller 108 can rotate up to 180 degrees. Further, the tension roller tensors 145 can hold and maintain tension during use of the positioning system 10. Similarly, the second tension roller 106 can also include a tension roller housing, a tension roller tensor, and a manual tension adjuster.

Figure 7:
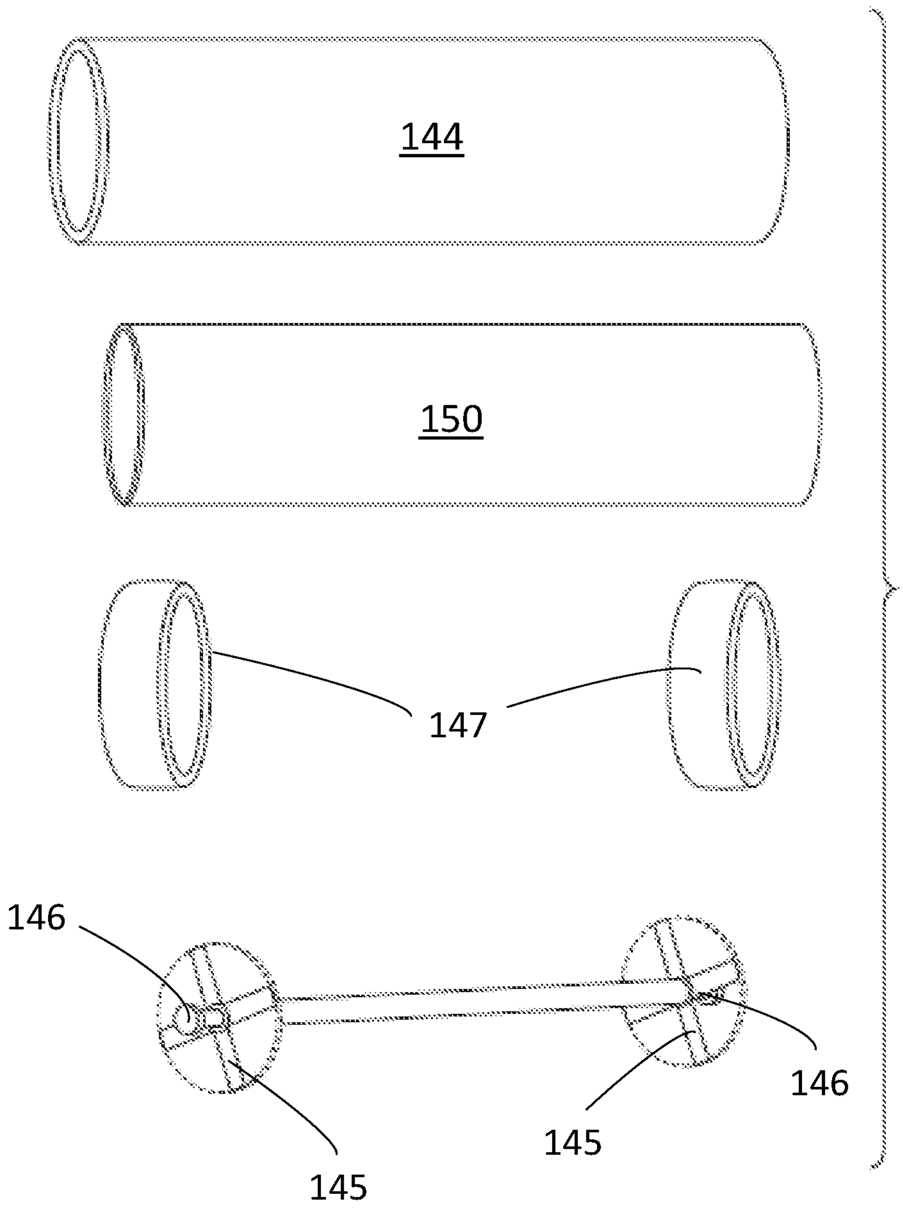
FIG. 7 illustrates an exploded view of the tension roller in the ready lift patient positioning system.

FIG. 7 illustrates an exploded view of the tension roller 106 in the ready lift patient positioning system 10. The first tension roller 106 includes an outer housing 144 that is preferably made of rubber or similar materials enabling the outer housing 144 to adhere (e.g. grip) to an exam sheet during use. Further, the first tension roller 106 includes an inner housing 150. The inner housing 150 includes components such as tension roller bearings 147. As aforementioned, the tension roller bearings 147 enable movement of the tension roller 108 up to 180 degrees. Similarly, the second tension roller 107 can also include an outer housing, an inner housing, and tension roller bearings. The user can rotate the manual tension adjuster 146 in opposite directions relative to the center guide 110 to increase or decrease tension in the tension sheet 108.

Figure 8:
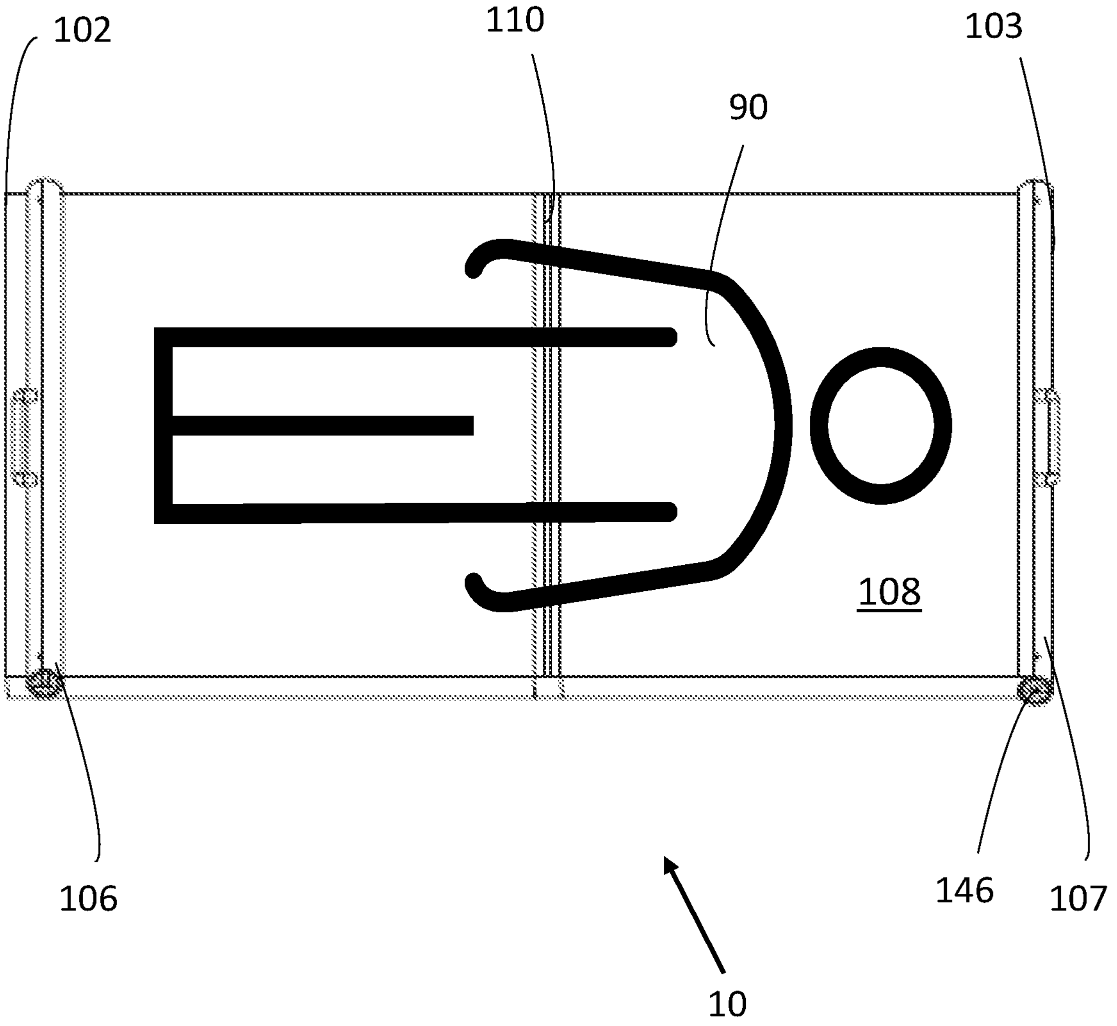
FIG. 8 illustrates a patient in a laying position on the patient positioning system.

FIG. 8 illustrates a patient 90 in a laying position on the patient positioning system 10. If a patient is in a laying position, the device is flat and not bent at the center guide 110. The patient's head can be located at either the first end 102 or the second end 103, with the patient's feet at the opposite end of the head.

Figure 9:
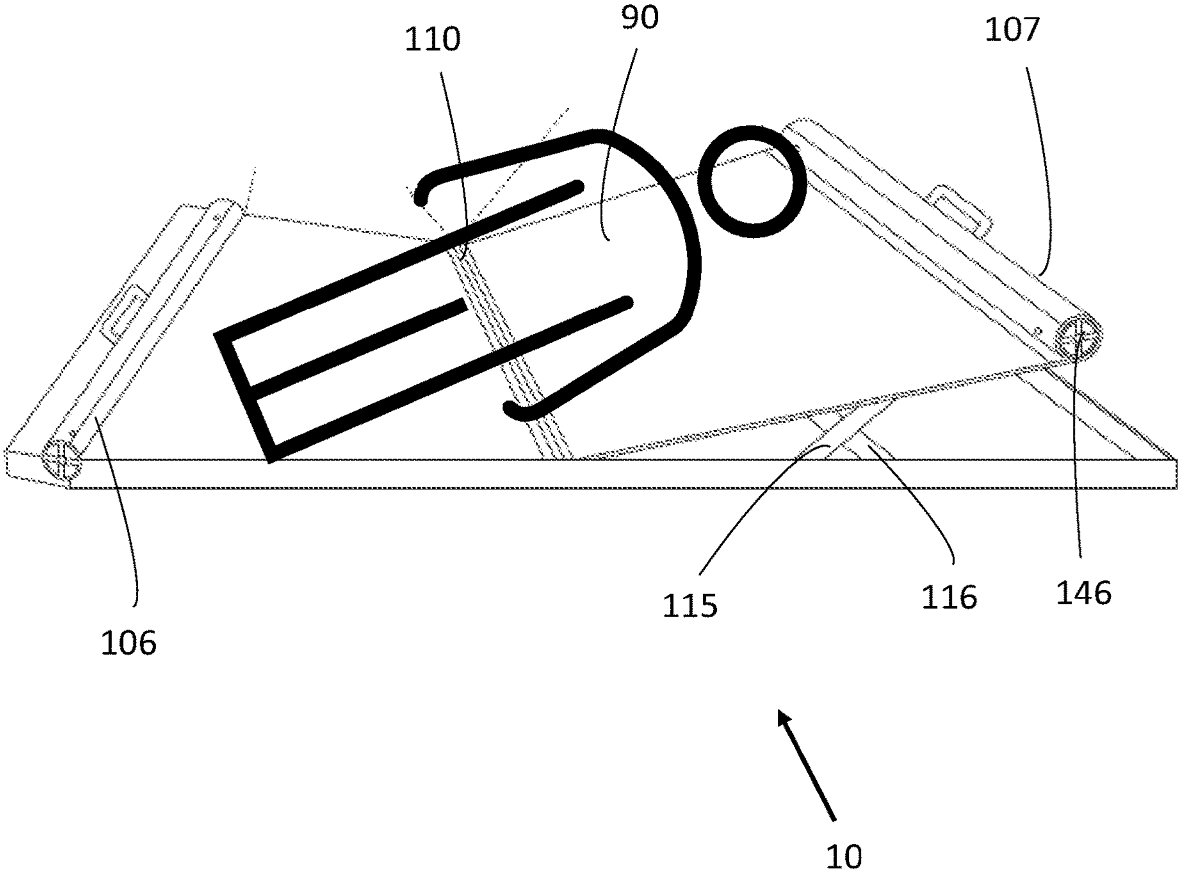
FIG. 9 illustrates a patient in a semi-upright sitting position on the patient positioning system.

One method of using the device of the patient positioning system 10 is to move a patient from a laying position to a sitting position. As shown in FIG. 9, the patient's head is located at the second end 103 of the device and the patient's feet are located at the first end 102 of the device. A user (e.g. caregiver) can decrease tension in the tension sheet 108 by rotating the manual tension adjuster 146 in a direction toward the center guide 110. The user can lift the first end of the device by grasping and lifting the first handle. Then, the user can move the first handle upward until the patient is in a sitting position. Once the patient is in a sitting position, the user can increase tension in the tension sheet 108 by rotating the manual tension adjuster 146 in a direction away from the center guide 110.

Another method of using the device of the patient positioning system 10 is to move a patient from a sitting position to a laying position. In this example, the patient's head is located at (near) the second end 103 of the device and the patient's feet are located at the second end 102 of the device. A user can decrease tension in the tension sheet 108 by rotating the manual tension adjuster 146 in a direction toward the center guide 110. The user can lift the first end of the device by grasping and lifting the first handle. Then, the user can move the first handle downward until the patient is in a laying position, as illustrated in FIG. 8. Once the patient is in a laying position, the user can increase tension in the tension sheet 108 by rotating the manual tension adjuster in a direction away from the center guide 110.

The invention claimed is:

1. A method of moving a patient from a laying position to a sitting position, the method comprising:

a. providing a device, wherein the device includes:
   i. a frame;
   ii. a tension sheet;
   iii. a center guide including a base;
   iv. wherein the base is configured to function as a hinge;
   v. the center guide is affixed to the tension sheet;
   vi. a first end and a second end;
   vii. the first end includes a first handle;
   viii. the first end further includes a first tension roller;
   ix. the first tension roller includes a plurality of fasteners;
   x. wherein the first tension roller fasteners are configured to affix the first tension roller to the tension sheet;
   xi. the first tension roller further includes an outer housing, a tension roller tensor, and a manual tension adjuster;
   xii. the second end includes a second handle;
   xiii. the second end further includes a second tension roller;
   xiv. the second tension roller includes a plurality of fasteners;
   xv. wherein the second tension roller fasteners are configured to affix the second tension roller to the tension sheet;
   xvi. the second tension roller further includes an outer housing, a tension roller tensor, and a manual tension adjuster;
   xvii. a first lift mechanism located on a first side of the frame;
   xviii. a second lift mechanism located on the first side of the frame;
   xix. a third lift mechanism located on a second side of the frame; and
   xx. a fourth lift mechanism located on the second side of the frame;
b. providing a patient, wherein the patient is in a laying position, with the patient's head located at the first end of the device and the patient's feet located at the second end of the device;
c. decreasing tension in the tension sheet by rotating the manual tension adjuster in a direction toward the center guide;
d. lifting, by a user, the first handle;
e. moving, by the user, the first handle until the patient is in a sitting position; and
f. increasing tension in the tension sheet by rotating the manual tension adjuster in a direction away from the center guide.

2. A method of moving a patient from a sitting position to a laying position, the method comprising:

a. providing a device, wherein the device includes:
   i. a frame;
   ii. a tension sheet;
   iii. a center guide including a base;
   iv. wherein the base is configured to function as a hinge;
   v. the center guide is affixed to the tension sheet;
   vi. a first end and a second end;
   vii. the first end includes a first handle;
   viii. the first end further includes a first tension roller;
   ix. the first tension roller includes a plurality of fasteners;
   x. wherein the first tension roller fasteners are configured to affix the first tension roller to the tension sheet;
   xi. the first tension roller further includes an outer housing, a tension roller tensor, and a manual tension adjuster;

xii. the second end includes a second handle;

xiii. the second end further includes a second tension roller;

xiv. the second tension roller includes a plurality of fasteners;

xv. wherein the second tension roller fasteners are configured to affix the second tension roller to the tension sheet;

xvi. the second tension roller further includes an outer housing, a tension roller tensor, and a manual tension adjuster;

xvii. a first lift mechanism located on a first side of the frame;

xviii. a second lift mechanism located on the first side of the frame;

xix. a third lift mechanism located on a second side of the frame; and xx. a fourth lift mechanism located on the second side of the frame;

b. providing a patient, wherein the patient is in a sitting position, with the patient's head located at the first end of the device and the patient's feet located at the second end of the device;

c. decreasing tension in the tension sheet by rotating the manual tension adjuster in a direction toward the center guide;

d. lifting, by a user, the first handle;

e. moving, by the user, the first handle until the patient is in a laying position; and f. increasing tension in the tension sheet by rotating the manual tension adjuster in a direction away from the center guide.

* * * * *